US010010795B2

(12) United States Patent
Coyne

(10) Patent No.: US 10,010,795 B2
(45) Date of Patent: *Jul. 3, 2018

(54) ENHANCED SOCIAL EXPRESSION CARD FOR USE WITH A VIDEOGAME

(71) Applicant: Activision Publishing, Inc., Santa Monica, CA (US)

(72) Inventor: John Coyne, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 14/174,507

(22) Filed: Feb. 6, 2014

(65) Prior Publication Data

US 2015/0217190 A1     Aug. 6, 2015

(51) Int. Cl.
| A63F 9/24 | (2006.01) |
| A63F 13/00 | (2014.01) |
| G06F 17/00 | (2006.01) |
| G06F 19/00 | (2018.01) |
| A63F 13/63 | (2014.01) |
| A63F 13/60 | (2014.01) |
| A63F 13/98 | (2014.01) |

(52) U.S. Cl.
CPC .............. *A63F 13/63* (2014.09); *A63F 13/60* (2014.09); *A63F 13/98* (2014.09); *A63F 2300/69* (2013.01)

(58) Field of Classification Search
USPC ................... 463/20, 25, 30, 31, 39, 42, 29
See application file for complete search history.

(56) References Cited

U.S. PATENT DOCUMENTS

| 5,316,345 A * | 5/1994 | Madison ................ B42D 15/02 283/101 |
| 6,200,216 B1 * | 3/2001 | Peppel ...................... A63F 9/24 463/1 |
| 2005/0211768 A1 * | 9/2005 | Stillman ................. G07F 11/00 235/381 |
| 2007/0006275 A1 * | 1/2007 | Wright ............. H04N 21/44204 725/133 |
| 2010/0240450 A1 * | 9/2010 | Vargas .................... A63F 13/12 463/29 |
| 2010/0258623 A1 * | 10/2010 | Beemer ..................... G06K 5/02 235/380 |
| 2012/0066122 A1 * | 3/2012 | Goldberg ............. G06Q 20/105 705/41 |
| 2012/0069131 A1 * | 3/2012 | Abelow ............... G06Q 10/067 348/14.01 |
| 2013/0225298 A1 * | 8/2013 | Hamlin et al. .................. 463/42 |

* cited by examiner

*Primary Examiner* — Adetokunbo O Torimiro
(74) *Attorney, Agent, or Firm* — Klein, O'Neill & Singh, LLP

(57) ABSTRACT

The present invention generally relates to methods and systems involving an enhanced social expression card that comprises machine-readable storage for data relating to one or more virtual goods. The one or more virtual goods may be, for example, redeemable in a virtual environment such as a videogame or an online virtual world.

19 Claims, 8 Drawing Sheets

ENHANCED SOCIAL EXPRESSION CARD FOR USE WITH A VIDEOGAME

BACKGROUND OF THE INVENTION

The invention relates generally to greeting cards, postcards, and other cards for social expression (collectively "social expression cards"). More specifically, the invention relates to systems and methods involving social expression cards comprising machine-readable storage that are usable with a videogame.

Social expression cards may include any variety of cards used to express a sentiment. Although not always the case, many social expression cards are themed for a particular sentiment, for example, congratulating and/or celebrating an event, birthday, holiday, or religious festival (e.g., graduation cards, birthday cards, Christmas cards, Hanukkah cards, Valentine's Day cards, Halloween cards, Easter cards, etc.). A social expression card traditionally features illustrations, graphics, images, and/or text relating to the card's theme. Recently, certain social expression cards have incorporated an audiovisual component to output audio (e.g., a song or message), video/visual effects (e.g., lighting effects), or both. Despite recent advancements, however, social expression cards still are only capable of delivering relatively basic, non-interactive experiences.

BRIEF SUMMARY OF THE INVENTION

One aspect of the invention provides a computer-implemented method for providing videogame gameplay, comprising: executing one or more computer software modules on a videogame platform to generate, for a player, a virtual environment associated with a videogame; receiving, by a peripheral connected to the videogame platform, data stored in a social expression card's machine-readable storage, the received data comprising auxiliary data and data relating to a virtual good; commanding presentation of the virtual good in the virtual environment, the presentation of the virtual good being determined, in part, by the auxiliary data.

Another aspect of the invention provides a social expression card for use with a videogame executing on a videogame console, the social expression card comprising: at least two surfaces; a first set of graphics and/or text printed on a first surface of the at least two surfaces, said first set of graphics and/or text relating to a theme of the social expression card; a second set of graphics and/or text printed on the first surface of the at least two surfaces, said second set of graphics and/or text relating to a product marking of the social expression card; a machine-readable storage affixed to a second surface of the at least two surfaces; wherein the machine-readable storage comprises data relating to one or more virtual goods and data relating to the theme of the social expression card; and wherein the machine-readable storage is one of a magnetic stripe, bar code, Q code, RFID tag, or NFC tag.

These and other aspects of the invention are more fully comprehended upon review of this disclosure.

DETAILED DESCRIPTION

The present invention generally relates to methods and systems involving an enhanced social expression card that comprises machine-readable storage for data relating to one or more virtual goods. The one or more virtual goods may be, for example, redeemable in a virtual environment such as a videogame or an online virtual world.

Figure 1A:
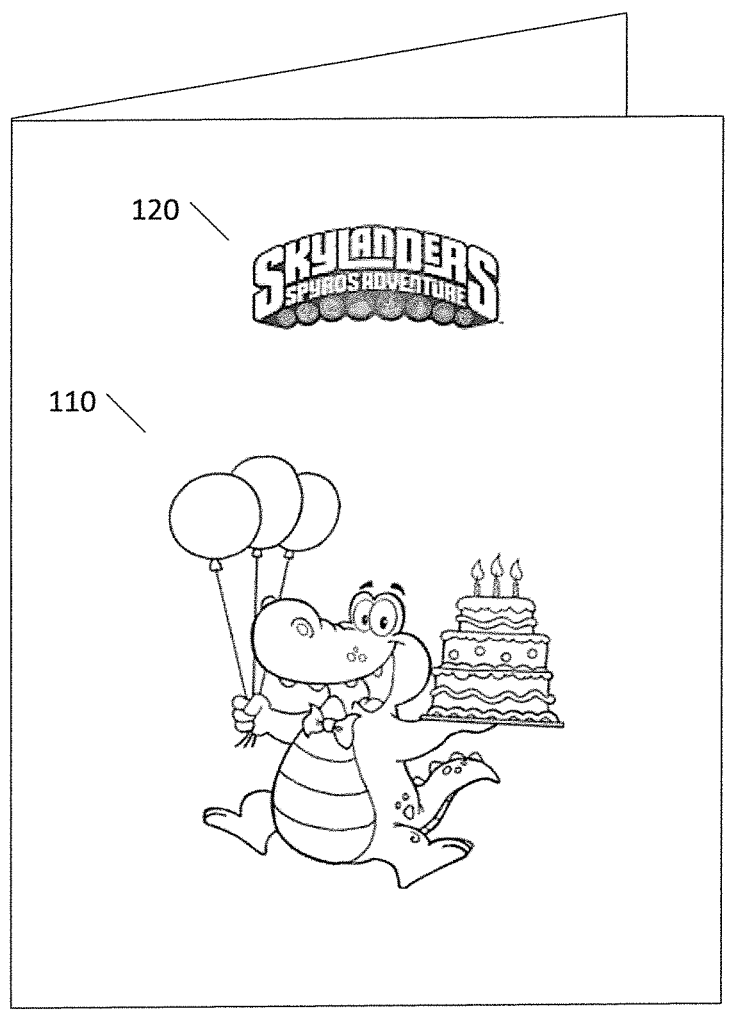
FIG. 1A illustrates an example of a social expression card in accordance with aspects of the invention.
Figure 1B:
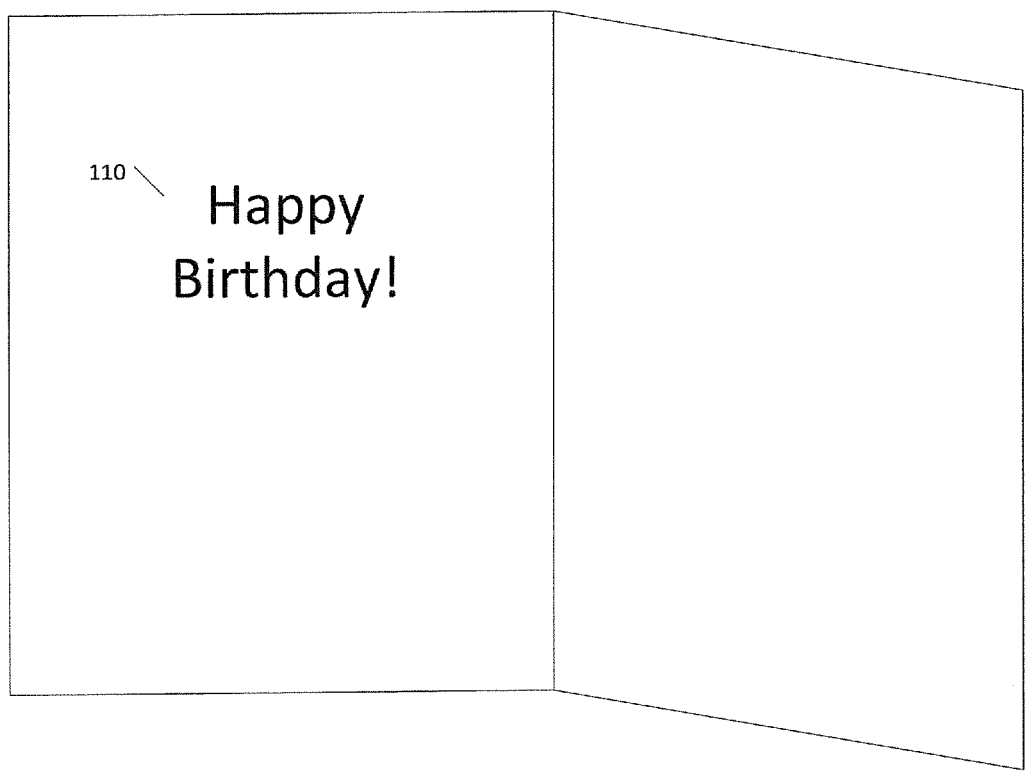
FIG. 1B illustrates an example of a social expression card in accordance with aspects of the invention.
Figure 1C:
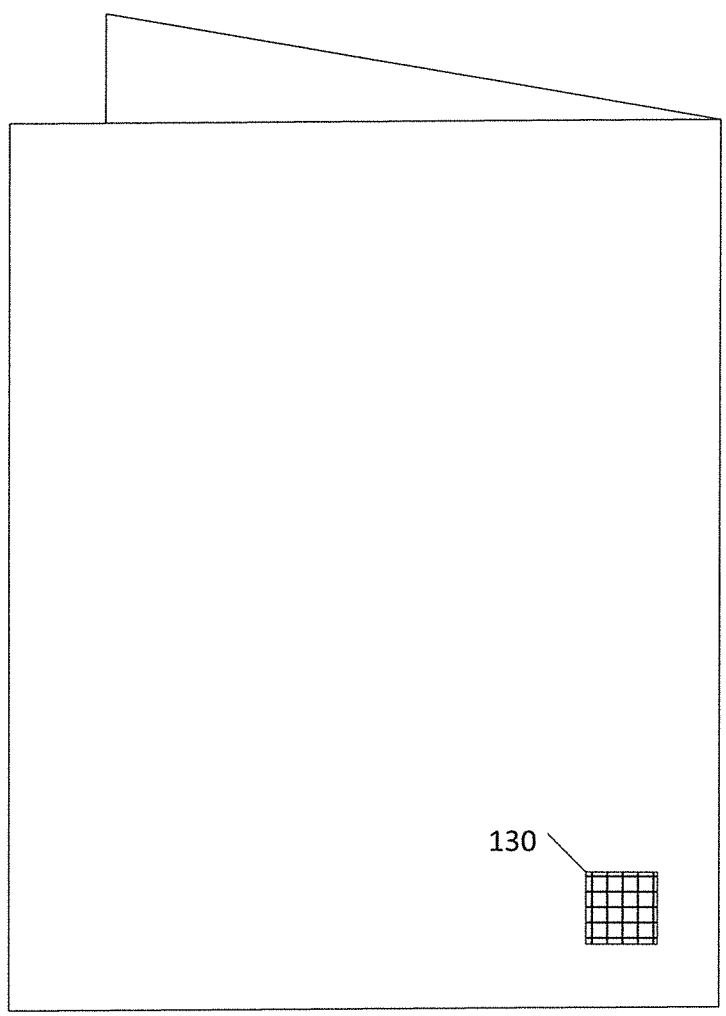
FIG. 1C illustrates an example of a social expression card in accordance with aspects of the invention.

FIGS. 1A, 1B, and 1C illustrate exemplary social expression card 100 in accordance with aspects of the invention. As used herein, the term "social expression card" is used broadly to encompass cards used to express a sentiment. In some aspects social expression cards provide a directed sentiment, with the social expression cards expressing a providing party's sentiment to a recipient of the card. In various embodiments, social expression cards may be in the form of greeting cards, postcards, and/or other forms of cards for social expression.

In accordance with aspects of the invention, FIGS. 1A and 1B show the front and inside surfaces, respectively, of an exemplary social expression card 100. As shown in FIGS. 1A and 1B, social expression card 100 comprises text and/or graphics 110 and 120. In the example of FIGS. 1A and 1B, text and/or graphics 110 relates to one or more themes of social expression card 100, in this case, a birthday theme. Of course, a given social expression card may comprise any desired theme(s), including for example, congratulating and/or celebrating an event, birthday, holiday, or religious festival (e.g., graduation cards, birthday cards, Christmas cards, Hanukkah cards, Valentine's Day cards, Halloween cards, Easter cards, etc.).

Social expression card 100 also comprises text and/or graphics 120, which relates to one or more product markings, in this case product markings relating to Activision Publishing, Inc.'s videogame SKYLANDERS SPYRO'S ADVENTURE®, a registered trademark of Activision Publishing, Inc. In addition to promotional and branding benefits, the product markings may indicate to purchasers and users of social expression card 100 that the card may be used with the videogame systems and/or methods disclosed herein. In some embodiments, the product markings may explicitly state that the social expression card is usable with a videogame system and/or method. For example, the product markings may state "This card comes to life with the Skylanders Portal of Power®," (both SKYLANDERS® and PORTAL OF POWER® are registered trademarks of Activision Publishing, Inc.).

FIG. 1C shows the back surface of exemplary social expression card 100 in accordance with aspects of the invention. Social expression card 100 comprises a machine-readable storage 130 for storing and/or referencing data relating to one or more virtual goods (i.e., data relating to the social expression card's payload). In some embodiments, machine-readable storage 130 further stores auxiliary data, as discussed in detail below. As shown in FIG. 1C, the machine-readable storage 130 is a radio-frequency identification (RFID) tag. Although machine-readable storage 130 is shown as visible on a rear of the social expression card in FIG. 1C, it should be recognized that in various embodiments, machine-readable storage 130 may not be externally visible. For example, machine-readable storage 140 may be encased within the card (e.g., disposed between two substrates of stock paper).

In various embodiments, other machine-readable storage and/or identification devices may be used for machine-readable storage 130, including, for example, magnetic stripes, RFID tags, NFC tags, Q codes, barcodes, or any other non-volatile memory. In some embodiments, the machine-readable storage may be read only. In other embodiments, the machine-readable storage may be read-writable. In some embodiments, alphanumeric codes or identifiers may be used instead of machine-readable storages and/or identifiers. For example, an alphanumeric identifier may be printed on social expression card 100. In some embodiments, multiple machine-readable storage components may be used. This may be useful to accommodate compatibility with different platforms, systems, and/or methods.

In some embodiments, social expression card 100 may further comprise a motion detecting component (not shown), such as a gyroscope, accelerometer, or some other suitable device coupled either directly or indirectly through some other controller component to the machine-readable storage. The motion detecting component may be programmed to detect certain motions, for example, the shaking of the social expression card. As discussed in more detail below, the detected motion can then be communicated through the machine-readable storage to a suitable system.

Although FIGS. 1A, 1B, and 1C depict social expression card 100 in a folded greeting card form factor, in various embodiments social expression card 100 may take any number of form factors including, for example, the form factor of a postcard, toy, keychain, memory stick, or any other device. Social expression card 100 may also be implemented in an electronic form in a computing device (e.g., a laptop, smartphone, personal computer, tablet, mobile device, etc.) as, for example, an electronic card or "e-Card." In such embodiments, the computing device itself may comprise an RFID or NFC component to facilitate communicating data relating to social expression card's virtual good(s) to a suitable system and/or method. Additionally or alternatively, the e-Card may present an alphanumeric code or identifier that the user inputs into the system and/or method.

Figure 2:
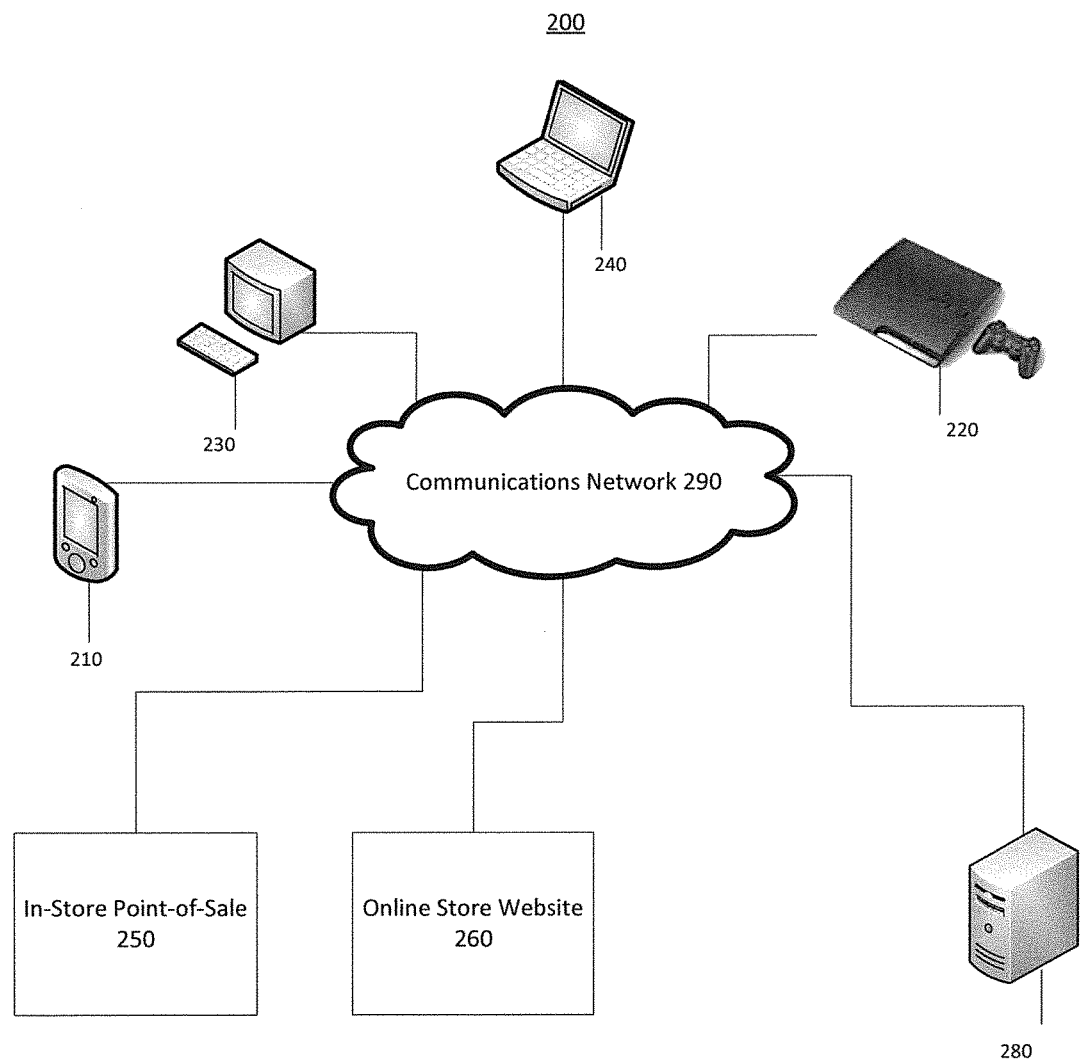
FIG. 2 illustrates an example system in accordance with aspects of the invention.

FIG. 2 illustrates an exemplary system 200 in accordance with aspects of the invention. System 200 provides for the purchase and use of social expression cards that comprise storage for data relating to one or more virtual goods (for example, social expression card 100 of FIGS. 1A, 1B, and 1C). System 200 includes various components, including one or more user devices 210-240, in-store point-of-sale system 250, online store website 260, virtual goods server 280, and communications network 290. Generally, communications network 290 allows for communication and data transmission between the various components of system 200. Communications network 290 may be, for example, the Internet. The number and arrangement of components of system 200 as shown in FIG. 2 are merely exemplary, and in many embodiments, many more components exist.

Generally, using in-store point-of-sale 250 or online store website 260 (in most embodiments by way of use of a user device 210, 220, 230, or 240), a user of system 200 may purchase or otherwise obtain social expression cards comprising data relating to one or more virtual goods. As discussed, a virtual good may be, for example, a virtual good redeemable in a virtual environment, for example, a videogame or an online virtual world.

In some embodiments, a purchaser of a social expression card may select the one or more virtual goods to be associated with the social expression card. For example, online store website 260 may allow a purchaser of a social expression card to create a customized greeting card with purchaser-defined text and/or graphics. Online store website 260 may further allow the purchaser to select the social expression card's one or more virtual goods from a catalog of virtual goods. As another example, an in-store kiosk may also allow purchasers to create customized social expression cards. Like online store website 260, the in-store kiosk may similarly allow purchasers to customize the social expression card's text and/or graphics and/or select the social expression card's one or more virtual goods from a catalog of virtual goods. In some embodiments, the in-store kiosk may include a reader peripheral the same or similar to the one discussed in connection with FIG. 3. In some embodiments, the costs of the virtual goods vary, with some being more expensive than others. Further, in some embodiments, additional fees may be charged for adding more than a certain amount of virtual goods (e.g., cards comprising more than two or some other number of virtual goods).

System 200 further comprises user devices 210-240, which allow a user to redeem the virtual goods on a social expression card and, in many cases, provide for videogame play. Generally, user devices 210-240 may be any compute devices suitable for executing videogames and/or communicating over communication network 210. In this example, system 200 comprises smartphone 210, videogame console 220, desktop computer 230, and laptop computer 240. Each user device 210-240 has one or more processors, memory, communication circuitry, user inputs, and associated hardware. User devices 210-240 may communicate with other components of system 200 by sending and receiving data through communication network 290.

After obtaining a social expression card, a user may redeem the social expression card's virtual good(s) through user devices 210-240. In some embodiments, the virtual good(s) may be used in a virtual environment such as a videogame or an online virtual world. Non-limiting examples of virtual goods include: virtual items (e.g., weapons, armor, equipment, clothes, skins, spells, abilities, vehicles, companions, etc.), virtual currency, points, experience, characters, gameplay levels, gameplay modes, etc. These examples of virtual goods are merely exemplary, and virtual goods may be any object, item, currency, or data for use in a virtual environment.

In some embodiments, user devices 210-240 may comprise or have associated therewith a reader suitable for communicating with the social expression card's machine-readable storage and retrieving the data relating to the greeting card's virtual good(s). Examples of suitable readers include magnetic stripe readers, barcode readers, RFID readers, NFC readers, Q code readers, etc. In some embodiments, user devices 210-240 may additionally or alternatively comprise user input devices for manually inputting a social expression card's unique alphanumeric identifier. In some embodiments, the user may redeem the data relating to the social expression card's virtual good(s) via user devices 210-240 at online store website 260. In such embodiments, online store website 260 may instruct the user to enter in a unique alphanumeric identifier associated with the social expression card that allows online store website 260 to crosslink the social expression card with an external account or otherwise determine the data relating to social expression card's virtual goods.

In some embodiments, the reader may be an integral component of user device 210-240. For example, user devices 210-240 may comprise an RFID reader or (NFC reader) for reading the social expression card's RFID tag (or NFC tag). Additionally or alternatively, the reader may be a separate peripheral coupled to user devices 210-240. In some embodiments, the reader may also be configured for reading machine-readable storage of other items, for example of a toy figure used during game play. In some embodiments, the virtual good may be for use with a virtual character representative of the toy figure.

After retrieving the information relating to the social expression card's virtual good(s), system 200 determines and redeems the social expression card's virtual good(s). In some embodiments, the user device determines and redeems the virtual good(s). In many embodiments, the user device, or in some embodiments a game server, for example providing for an online game, which receives information of the virtual good(s) from the user device, will update or modify a virtual environment, for example of a videogame, to include the redeemed virtual good(s). In some embodiments, the data relating to the social expression card's virtual good(s) is sufficient for the user device or other system component to determine the redeemed virtual good(s). For example, in some embodiments, the information relating to a virtual good may correspond to only one virtual good. In some embodiments, the user device may present to a user a list of available virtual goods, with the user device determining a redeemed virtual good based upon receipt of a selection from the available goods by the user. In some cases, the user device may transmit the data relating to the social expression card's virtual good(s) to a virtual goods server 280 to determine the virtual good(s) associated with the social expression card, with in some embodiments the virtual goods server determining the virtual good(s) by way of transmitting information regarding available virtual good(s) to the user device, and receiving information regarding a selection of a virtual good or goods from the user device, as indicated by a user.

Figure 3:
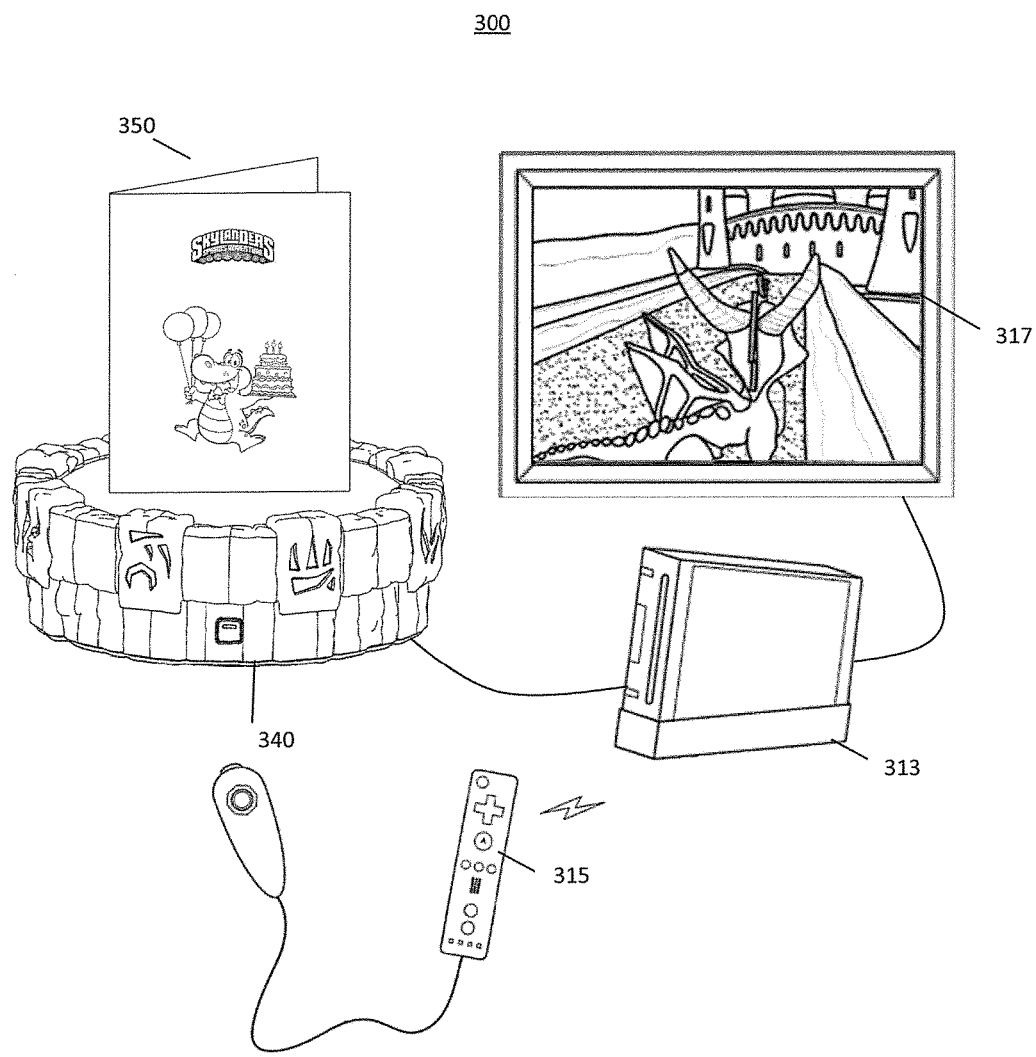
FIG. 3 illustrates an example videogame console in accordance with aspects of the invention.

FIG. 3 shows an exemplary videogame console 300 that comprises a peripheral reader 340 suitable for retrieving the data relating to a social expression card's virtual good(s) in accordance with aspects of the invention. Videogame console 300, in various embodiments, may be any videogame platform including but not limited to a Playstation®, Xbox®, Wii®, Nintendo DS®, personal computer, or mobile gaming device. Videogame console 300 generally includes a videogame device 313 with a processor for executing program instructions providing for game play and associated circuitry, a user input device such as a videogame controller 315, a display device 317, and a peripheral reader 340. Although FIG. 3 depicts a display 317, peripheral reader 340, and videogame controller 315 as separate components, it is understood that the in other embodiments, one or more of these components may be integrated into a single device or different combination of devices.

The processor of videogame device 313, responsive to inputs from user input device and the peripheral 340, generally commands display on the display device 317 of game characters in and interacting with a virtual environment of gameplay and possibly each other, with control of at least one game character generally based on inputs from the user input device. In addition, the processor, responsive to inputs from peripheral reader 340, for example inputs based on data read from a social expression card's machine-readable storage, may be used to redeem virtual goods in the virtual environment. In particular, when a social expression card 350 is placed in proximity of peripheral reader 340, for example, on peripheral reader 340's upper surface, peripheral reader 340 communicates with the social expression card's machine-readable storage to retrieve data relating to the social expression card's virtual goods and/or other auxiliary data. The data relating to the social expression card's virtual goods (and/or the auxiliary data) is then used to redeem one or more virtual goods to be used in the virtual environment of the videogame, for example as discussed with respect to FIG. 2. For example, the data relating to the social expression card's virtual good(s) may dictate that the user be granted a virtual good or item (e.g., weapons, armors, equipment, clothes, spells, abilities, vehicles, companions, etc.), virtual currency, points, experience, new characters, new levels, new game play modes, etc. These examples of uses for the social expression card's virtual good(s) are merely exemplary, and the data on the social expression card may be redeemed for any number of virtual goods in various embodiments.

In some embodiments, the processor, for example executing program instructions providing for gameplay, may also include characters in gameplay based on inputs from peripheral reader 340, for example when certain toys and/or objects are placed in proximity to peripheral reader 340. The processor may also control actions and activities of game characters based on inputs from the user input devices. Furthermore, the processor, responsive to inputs from peripheral reader 340, may be used to change the characteristics, powers, and/or attributes of characters and objects in the virtual world. For example, a character in gameplay may have one or more characteristics, powers, and/or attributes associated with it, such as health, strength, power, speed, wealth, shield, weapons, special abilities, spells, or achievement level, for example. The processor may alter one or more characteristics, powers, and/or attributes associated with a character in response to inputs from peripheral reader 340. As discussed above, the functionality of peripheral reader 340 may, in some embodiments, be integrated into videogame console 300 (or some other user device) itself.

Still referring to videogame console 300 of FIG. 3, the instructions providing for gameplay are generally stored on removable media, for example, an optical disk. Accordingly, videogame console 300 may include an optical drive, for example, a DVD-ROM, CD-ROM, or Blu-ray drive, for reading the instructions for gameplay. In some embodiments, the removable media may be a flash memory data storage device. In some embodiments, videogame console 300 may be a personal computer, including similar internal circuitry as herein described, as well as, for example, a built-in display and built-in user input devices, such as a keyboard and a touch pad or mouse. In other embodiments, the instructions providing for gameplay may be stored in a remote server that is accessed by a computer or mobile device. In yet other embodiments, the instructions providing for gameplay may be stored on the local memory of the game console.

The display device 317 of videogame console 300 is generally coupled to the gaming device by a cable, although in some embodiments a wireless connection may be used. In many embodiments, display device 317 is a liquid crystal display. In some embodiments, display device 317 is a television. In some embodiments, display device 317 is a cathode ray display, a plasma display, an electroluminescent display, an LED or OLED display, or other suitable display. A display screen of display device 317 displays video images of gameplay, generally as commanded by the processor or other associated circuitry of the videogame console.

Peripheral reader 340, in some embodiments and as shown in FIG. 3, has a substantially flat upper surface for placement of one or more social expression cards thereon. The user generally places social expression cards, for example social expression card 350 or the exemplary social expression card of FIGS. 1A, 1B, and 1C, on the flat surface of peripheral reader 340 during game play to retrieve data relating to the social expression card's virtual good(s).

In some embodiments, the peripheral reader 340 may also read information from toys associated with the videogame. In such embodiments, the game player generally places game toys on the flat surface of peripheral reader 340 during game play. Each toy may include machine-readable/writable information, for example, memory or a radio frequency identification (RFID) tag. The machine-readable/writable information may be sensed, read, and/or written by peripheral reader 340 and/or the gaming device, directly or indirectly to the toy memory and/or tag.

In some embodiments, when a toy memory or tag is read by peripheral reader 340, peripheral reader 340 provides the gaming device an indication of the identifier and status information of the toy, and generally the processor of the gaming platform commands display of a corresponding game character or videogame object, or otherwise makes the corresponding game character or videogame object available in gameplay. In other embodiments, game-related information stored on the toy may be read and used by the processor to conduct a gameplay sequence. For example, characteristics, powers, and/or abilities of previously-defeated characters may be read and used by the processor to alter or enhance the user's character. In some embodiments, information relating to the user's character may be stored in a toy or object different from the toy or object that stores the information relating to the previously-encountered or defeated characters. In some embodiments, the virtual goods may be restricted to virtual goods used in or for a videogame featuring game characters associated with such toys.

The toy may include a rewritable memory. In various embodiments the rewriteable memory includes information of a game character. The user may place the toy on peripheral reader 340, and in some embodiments, the user may be allowed to place multiple toys on the peripheral reader 340. With the toy on the peripheral reader, the peripheral reader may read the information of the game character, and provide the information to the videogame device, with the videogame device inserting the character into gameplay. In some embodiments, the peripheral reader, for example as commanded by the videogame console, may write information regarding a redeemed virtual good to the rewriteable memory.

Figure 4:
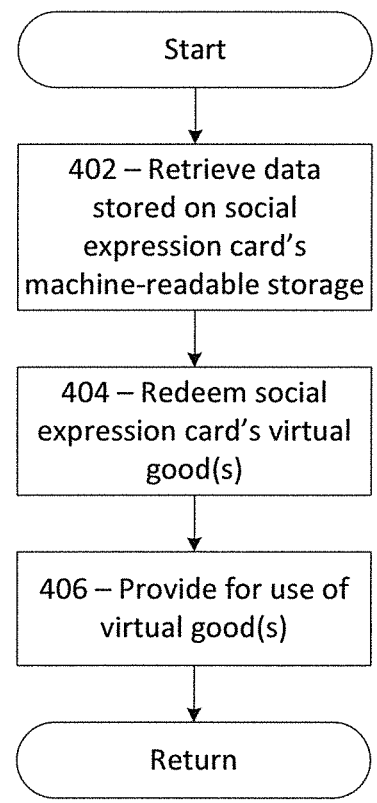
FIG. 4 is a flowchart of a process for using a social expression card in accordance with aspects of the invention.

FIG. 4 is an exemplary process for using a social expression card in accordance with aspects of the invention. In some embodiments, the process may be performed by a social expression card as described in connection with FIGS. 1A, 1B, and 1C and a user device as described in connection with FIGS. 2 and 3, and, in various embodiments, various elements of system 200 of FIG. 2. In block 402, the process retrieves data relating to the social expression card's virtual good(s). As discussed above, a user device may retrieve this data from a social expression card's machine-readable storage. For example, a user device may read, detect, sense, or otherwise communicate with the social expression card's machine-readable storage using a suitable reader, for example, a magnetic stripe reader, barcode reader, RFID reader, NFC reader, Q code reader, etc. and retrieve the data stored on the social expression card's machine-readable storage. In some embodiments, the reader may be an external peripheral reader connected to the user device (either wirelessly or through a wire). Alternatively or additionally, the reader may be integrated into the user device.

In block 404, the process determines and redeems the social expression card's virtual good(s). The virtual good(s) may represent any number of virtual goods or items, virtual currency, points, experience, new characters, new levels, new game play modes, etc. For example, in some embodiments, the retrieved data relating to the social expression card's virtual good(s) may dictate that the user be granted new virtual goods, such as weapons, armors, equipment, clothes, spells, abilities, vehicles, companions, etc. These examples of uses for the social expression card's virtual good(s) are merely exemplary, and the virtual good(s) may be redeemed for any number of virtual goods, depending in part on the virtual environment. In some embodiments, available virtual goods for redemption may depend on an identity of a particular game executing or available on the user's device, and/or a version of such a game or some other aspect relating to gameplay. In some embodiments a user may have a choice in selection of the virtual good, for example as discussed with respect to FIG. 2.

In some embodiments, the data relating to the social expression card's virtual good(s) is sufficient for the user device to determine the social expression card's virtual good(s). Alternatively or additionally, the user device may transmit the data relating to the social expression card's virtual good(s) to another entity, for example a virtual goods server, to determine the social expression card's virtual good(s).

In block 406, the process provides for use of the virtual good(s) in the virtual environment. In some embodiments, for example, the process commands display to the user of a description of the redeemed virtual good. In some embodiments, the process commands gameplay involving the redeemed virtual good. Thereafter, the process returns.

Figure 5:
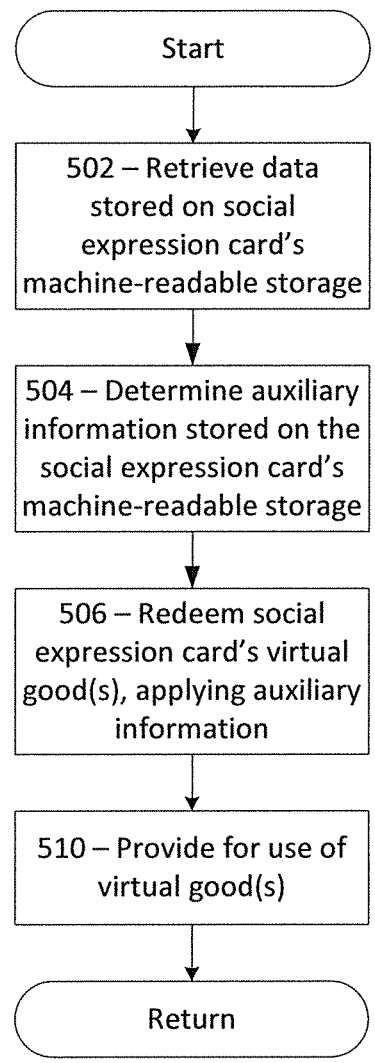
FIG. 5 is a flowchart of a process for using a social expression card in accordance with aspects of the invention.

FIG. 5 is an exemplary process for using a social expression card in accordance with aspects of the invention. In some embodiments, the process may be performed by a social expression card as described in connection with FIGS. 1A, 1B, and 1C and a user device as described in connection with FIGS. 2 and 3, and, in various embodiments, various elements of system 200 of FIG. 2.

In block 502, the process retrieves data stored on the social expression card's machine-readable storage. In addition to data relating to the social expression card's virtual good(s), the data may include one or more pieces of auxiliary information, for example, information relating to one or more theme(s) of the social expression card, information relating to the recipient of the card, information relating to the purchaser of the card, and/or information relating to the products or platforms associated with the social expression card. As discussed above, a user device may read, detect, sense, or otherwise communicate with the social expression card's machine-readable storage using a suitable reader, for example, a magnetic stripe reader, barcode reader, RFID reader, NFC reader, Q code reader, etc. and retrieve the data stored on the social expression card's machine-readable storage. In some embodiments, the reader may be an external peripheral reader connected to the user device (either wirelessly or through a wire). Alternatively or additionally, the reader may be integrated into the user device.

In block 504, the process determines the auxiliary information retrieved from the social expression card. The auxiliary information may be any information desired to be stored by the system. For example, the auxiliary information may include the identification of one or more themes relating to the social expression card. A given social expression card may comprise any desired theme(s), including for example, congratulating and/or celebrating an event, birthday, holiday, or religious festival (e.g., graduation cards, birthday cards, Christmas cards, Hanukkah cards, Valentine's Day cards, Halloween cards, Easter cards, etc.). Generally, the text and/or graphics printed on the social expression card will relate to the one or more themes identified in the machine-readable storage of the social expression card. For example, birthday themed card that has birthday themed text and/or graphics may store information in its machine-readable storage identifying the card as relating to a birthday theme.

Additionally or alternatively, the auxiliary information may comprise information relating to the recipient and/or purchaser of the social expression card. In some embodiments, the information relating to the recipient and/or purchaser may be retrieved from the social expression card's machine-readable storage. In such embodiments, the purchaser of the social expression card may have customized the card to include such information, for example at an online store website or an in-store kiosk. Alternatively or additionally, the information relating to the recipient may be stored in the user device (e.g., videogame console), for example, in the recipient's videogame platform user account (e.g., Xbox Live or PlayStation Network) or the recipient's user account for a particular videogame.

In block 506, the process determines and redeems the social expression card's virtual good(s), applying one or more pieces of auxiliary information. For example, the process may, in some embodiments, modify a virtual good and/or the presentation of a virtual good in view of the social expression card's theme and/or the purchaser/recipient information. As an example, in a birthday-themed social expression card to recipient John Doe from Jane Doe, the presentation of the virtual good within the videogame may be accompanied by a graphical splash screen that displays "Happy 8$^{th}$ Birthday, John! From, Jane." As another example, for a Christmas themed social expression card, a virtual Santa Claus may present the virtual good to the recipient, and the virtual good may be "skinned" to have a Christmas-related appearance (e.g., red and green coloring). As another example, for an Easter-themed social expression card, the virtual good may be presented to the user by a virtual Easter Bunny character. Of course, any manner of presentation and customization based on auxiliary information may be applied.

In some embodiments, the data relating to the social expression card's virtual good(s) is sufficient for the user device to determine the social expression card's virtual good(s). Alternatively or additionally, the user device may transmit the data relating to the social expression card's virtual good(s) to another entity, for example a virtual goods server, to determine the social expression card's virtual good(s).

In block 508, the process provides for use of the virtual good(s) in the virtual environment. In some embodiments, for example, the process commands display to the user of a description of the redeemed virtual good. In some embodiments, the process commands gameplay involving the redeemed virtual good. Thereafter, the process returns.

In some embodiments of the processes of FIGS. 4 and 5, the process may further receive motion detected by one or more motion sensing components in the social expression card. The motion sensing component may be, in some embodiments, a gyroscope or accelerometer, which in some embodiments, could be coupled to a power source and/or controller. In some embodiments, MEMS components may be used to reduce the footprint of such components. When the motion sensing component detects motion of the social expression card, for example, shaking of the card, the information is communicated to the peripheral or a suitable reader and may be used in the videogame to further modify or alter the presentation of the virtual good. For example, if the virtual good was a certain number of virtual coins, the shaking of the social expression card could cause the presentation of additional virtual coins being gifted to the user in the virtual universe. In some embodiments, the motion may be used to cause the initial presentation of the virtual goods in the virtual environment.

Figure 6:
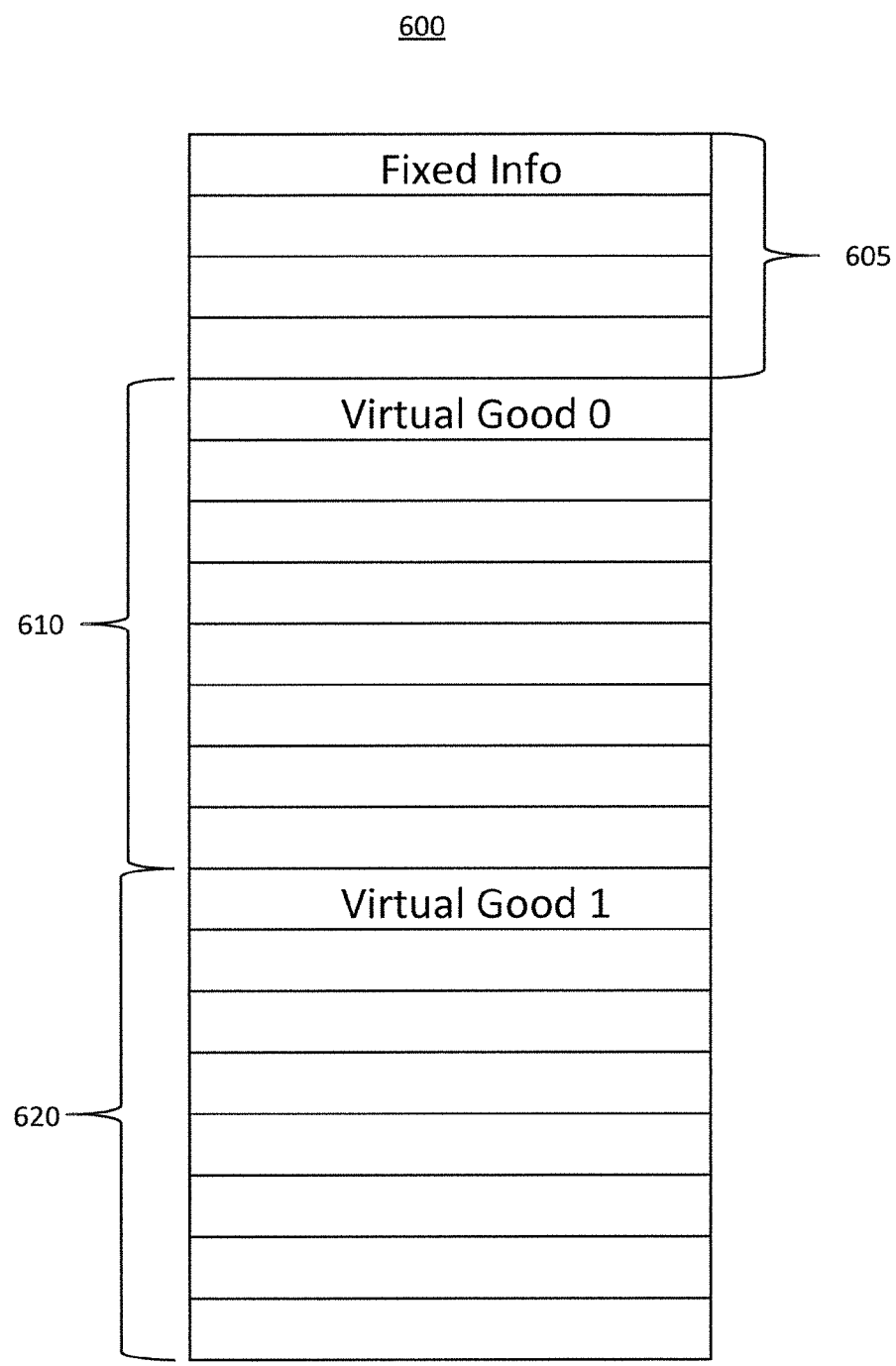
FIG. 6 is a diagram of data structure in accordance with aspects of the invention.

FIG. 6 is a diagram of an exemplary data 600 structure in accordance with aspects of the invention. Data structure 600 may be used to store data relating to a social expression card's virtual good(s). Data about the social expression card's virtual good(s) value are stored at various locations in the data structure. Although various fields of the data structure are shown in particular locations in FIG. 6, the data structure may use a different arrangement of the fields.

Data structure 600 includes an area of fixed information 605. The fixed information includes information that identifies the social expression card, for example, the fixed information may include an alphanumeric identifier that uniquely identifies the social expression card. The fixed information may also include an identification of the card issuer, the retailer, or the virtual environment suitable for redeeming the virtual good(s). The fixed information may include a field for data verification, for example, a cyclic-redundancy check value or checksum.

The data structure also includes a first virtual good data area 610 and a second virtual good data area 620. Each of the virtual good data areas contains information sufficient to represent or reference a redeemable virtual good. For example, the first virtual good data area may include data that specifies that the virtual good stored on the social expression card is virtual currency. The first virtual good data area may also include information about the quantity of the virtual currency stored on the social expression card. Of course, the first virtual good area may be used to identify any number of virtual goods.

The second virtual good data area 620 allows for storage of an additional virtual good on the social expression card and also may add redundancy. In general, virtual good data areas may be added as needed depending on the number of virtual goods desired to be stored on the social expression card.

Although the invention has been discussed with respect to various embodiments of a social expression card storing data relating to one or more virtual good(s), the teachings of the present invention may be applied to other objects and other forms of cards as well. For example, the invention supports a novel collectible card that includes a machine-readable storage for storing data relating to the collectible card. Collectible cards may be, for example, cards depicting the image of a certain person, place, or thing (fictional or real), a short description of the depicted item, along with other supporting text (e.g., statistics, trivia, characteristics, attacks, spells, hit points, etc.). Examples of collectible cards include sports-related collectible cards (e.g., baseball cards, football cards, basketball cards, etc.) and non-sports-related collectible cards (e.g., cards relating to comic books, videogames, movies, television shows, trading card games, etc.).

Although the invention has been discussed with respect to various embodiments, it should be recognized that the invention comprises the novel and non-obvious claims supported by this disclosure.

What is claimed:

1. A computer-implemented method for providing videogame gameplay, comprising:
    executing one or more computer software modules on a videogame platform to generate, for a player, a virtual environment associated with a videogame;
    receiving, by a peripheral connected to the videogame platform, data stored in a social expression card's machine-readable storage, the received data comprising auxiliary data and data relating to a virtual good, the machine-readable storage comprising a radio-frequency identification (RFID) tag, the peripheral comprising an RFID reader;
    commanding presentation of the virtual good in the virtual environment, the presentation of the virtual good being determined, in part, by the auxiliary data.

2. The computer-implemented method of claim 1, wherein the auxiliary data comprises information relating to a theme of the social expression card.

3. The computer-implemented method of claim 2, wherein the virtual good is virtual currency.

4. The computer-implemented method of claim 1, wherein the auxiliary data comprises information relating to a recipient of the social expression card.

5. The computer-implemented method of claim 4, wherein the presentation of the virtual good in the virtual environment comprises displaying information relating to a recipient of the social expression card.

6. The computer-implemented method of claim 1, further comprising: receiving instructions for customizing the appearance of the social expression card.

7. The computer-implemented method of claim 1, wherein the presentation of the virtual good in the virtual environment is modified by applying one or more pieces of the auxiliary data.

8. The computer-implemented method of claim 1, wherein the auxiliary data comprises information relating to a theme of the social expression card, and the presentation of the virtual good in the virtual environment is in view of the theme of the social expression card by applying one or more pieces of the auxiliary data.

9. The computer-implemented method of claim 1, wherein the auxiliary data comprises information relating to a recipient and/or a purchaser of the social expression card, and the presentation of the virtual good in the virtual environment is in view of the recipient and/or the purchaser of the social expression card by applying one or more pieces of the auxiliary data.

10. A social expression card for use with a videogame executing on a videogame console, the social expression card comprising:
    at least two surfaces;
    a first set of graphics and/or text printed on a first surface of the at least two surfaces, said first set of graphics and/or text relating to a theme of the social expression card;
    a second set of graphics and/or text printed on the first surface of the at least two surfaces, said second set of graphics and/or text relating to a product marking of the social expression card; and
    a machine-readable storage in the form of a radio-frequency identification (RFID) tag, affixed to a second surface of the at least two surfaces;
    wherein the machine-readable storage comprises data relating to one or more virtual goods and data relating to the theme of the social expression card; and
    wherein the one or more virtual goods comprise one or more virtual items that may be used in a videogame.

11. The social expression card of claim 10, wherein the theme of the social expression card is either a Christmas or Hanukkah theme.

12. The social expression card of claim 10, wherein the theme of the social expression card is a Halloween theme.

13. The social expression card of claim 10, wherein the theme of the social expression card is a Easter theme.

14. The social expression card of claim 10, wherein the theme of the social expression card is a birthday theme.

15. The social expression card of claim 14, wherein the virtual good is customized for a recipient of the social expression card.

16. The social expression card of claim 15, wherein the customization utilizes the recipient's name.

17. The social expression card of claim 15, wherein the customization utilizes the recipient's age.

18. The social expression card of claim 10, wherein the one or more virtual goods comprise one or more virtual goods redeemable in a virtual world of a videogame.

19. The social express card of claim 10, wherein the data relating to one or more virtual goods and the data relating to the theme of the social expression card are customizable.

* * * * *

UNITED STATES PATENT AND TRADEMARK OFFICE
CERTIFICATE OF CORRECTION

PATENT NO. : 10,010,795 B2
APPLICATION NO. : 14/174507
DATED : July 3, 2018
INVENTOR(S) : John Coyne It is certified that error appears in the above-identified patent and that said Letters Patent is hereby corrected as shown below:

In the Claims

In Column 12, Line 46, Claim 19, delete "express" and insert --expression--, therefor.

Signed and Sealed this
Fifth Day of May, 2020

Andrei Iancu
*Director of the United States Patent and Trademark Office*